(12) United States Patent
Buchanan et al.

(10) Patent No.: US 9,542,441 B1
(45) Date of Patent: *Jan. 10, 2017

(54) USING WEB RANKING TO RESOLVE ANAPHORA

(71) Applicant: Google Inc., Mountain View, CA (US)

(72) Inventors: Michael Buchanan, Mountain View, CA (US); Mark Andrew Paskin, Palo Alto, CA (US); Pravir Kumar Gupta, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,268

(22) Filed: Nov. 6, 2015

Related U.S. Application Data

(63) Continuation of application No. 13/803,410, filed on Mar. 14, 2013, now Pat. No. 9,183,257.

(51) Int. Cl.
*G06F 17/30* (2006.01)

(52) U.S. Cl.
CPC ....... *G06F 17/3043* (2013.01); *G06F 17/3053* (2013.01); *G06F 17/30477* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 7,401,077 B2 | 7/2008 | Bobrow et al. | |
| 7,953,746 B1 | 5/2011 | Garg et al. | |
| 8,131,540 B2 | 3/2012 | Marchisio et al. | |
| 8,326,833 B2 | 12/2012 | Muguda | |
| 8,396,824 B2 | 3/2013 | Au | |
| 8,612,208 B2 | 12/2013 | Cooper et al. | |
| 2006/0282414 A1 | 12/2006 | Sugihara et al. | |

*Primary Examiner* — Hung Q Pham
(74) *Attorney, Agent, or Firm* — Fish & Richardson P.C.

(57) ABSTRACT

The specification relates to a method of receiving a first query and a second query. The method analyzes the second query for a presence of anaphora. If anaphora is present, the method analyzes the first query for a presence of an entity that can be associated with the anaphora. If the analysis analyzing the first query returns two or more associated entities, the method forms a third query wherein the anaphora of the second query is replaced with one of the associated entities and forms a fourth query wherein the anaphora is replaced with the other of the associated entities. The third query and the fourth query are sent to a query-ranking engine. The third query and the fourth query receive a ranking and the higher-ranked query is sent to a search engine.

20 Claims, 6 Drawing Sheets

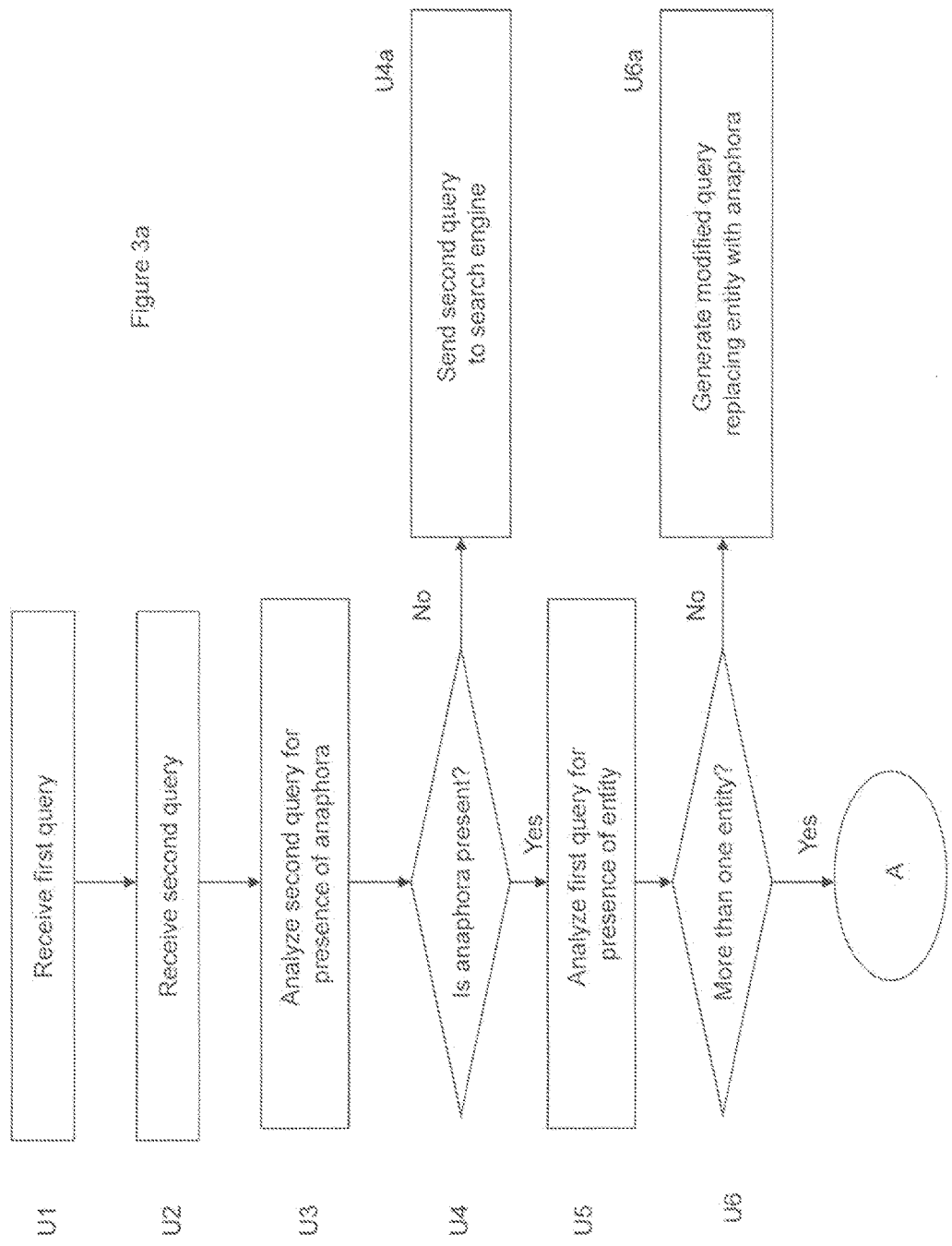

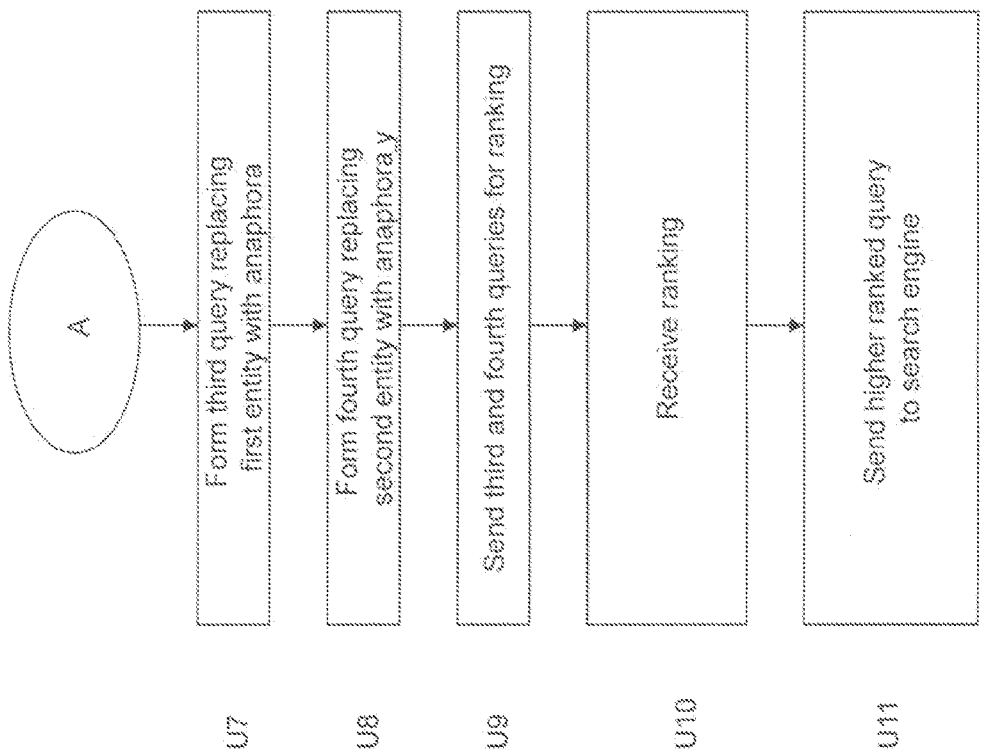

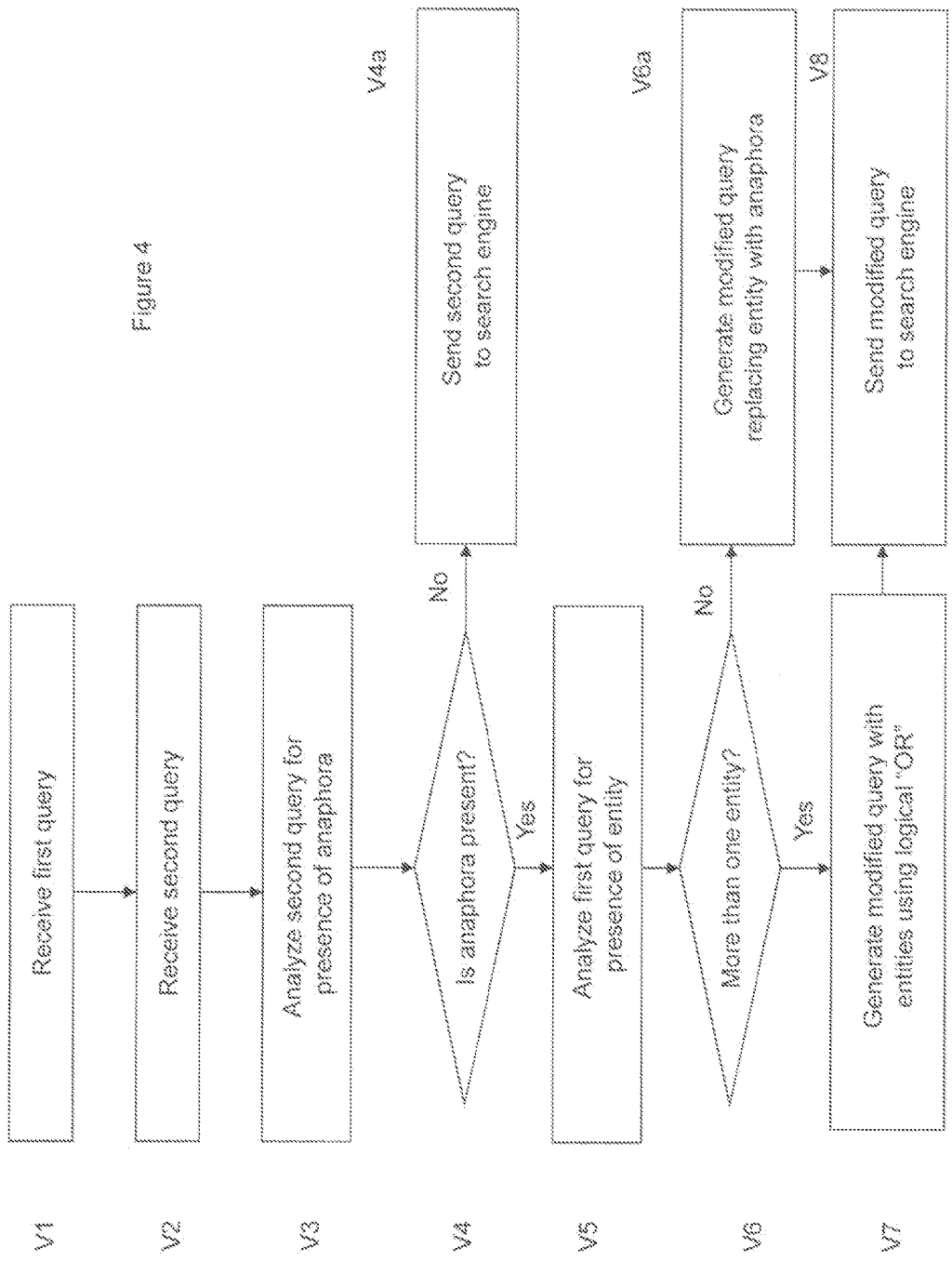

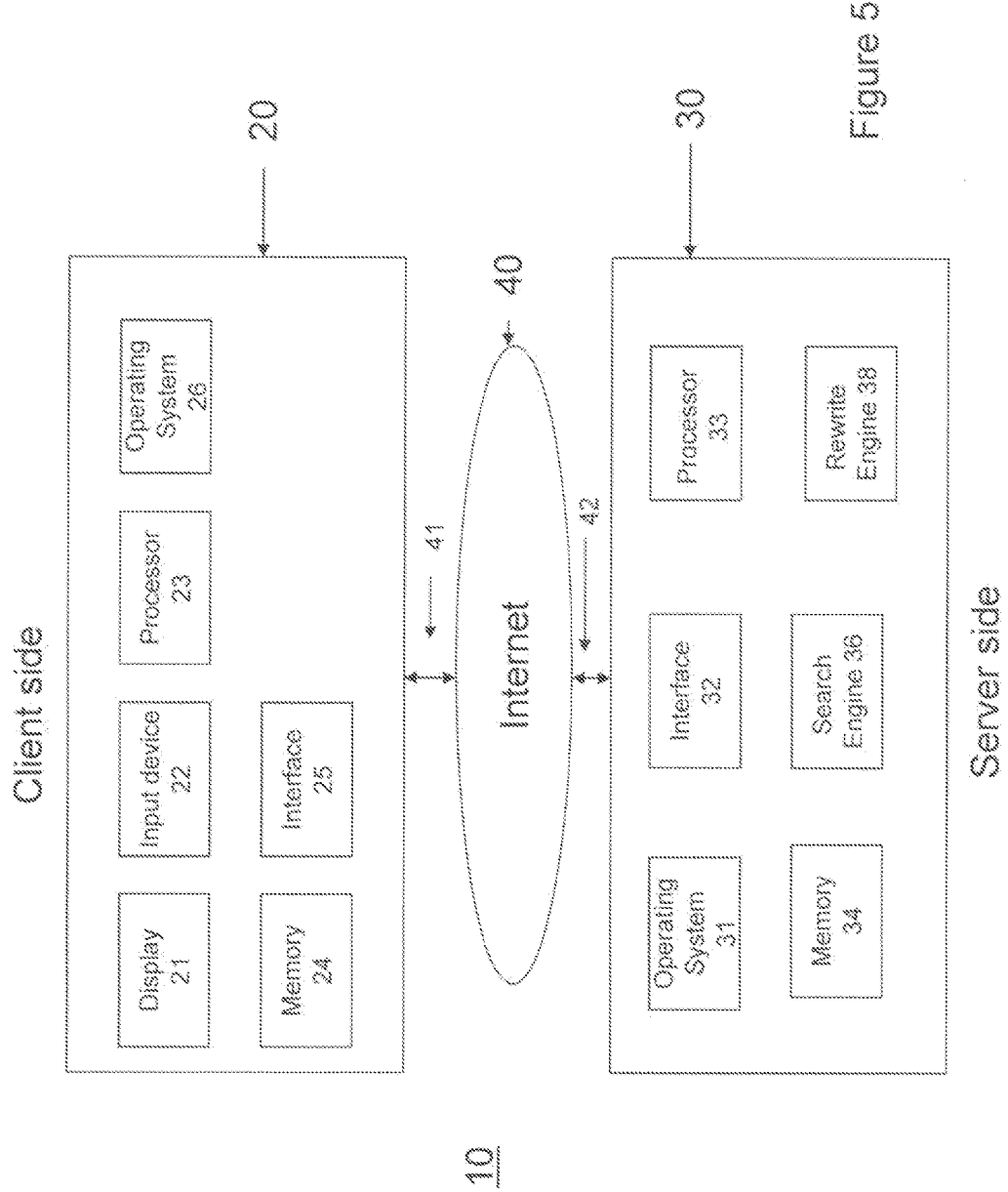

USING WEB RANKING TO RESOLVE ANAPHORA

CROSS-REFERENCE TO RELATED APPLICATION

This is a continuation of U.S. application Ser. No. 13/803,410, filed on Mar. 14, 2013, the disclosure of which is hereby incorporated by reference in its entirety.

BACKGROUND

The subject matter described herein relates to providing search results in response to search queries. A search engine receives search queries from one or more input sources, e.g., a client device, a server or any device that may submit a query and the search engine returns search results responsive to the queries. As another example, the search engine can receive queries from and return search results to a computing resource, such as another search engine.

The search engine can also identify resources responsive to a search query, generate search results with information about the resources, and provide search results in response to the query. Examples of resources include, e.g., documents, web pages, videos, books, sound files, etc. Other types of search results can also be provided, for example, answers to questions posed by the user, or a summary of information responsive to the user's query.

SUMMARY

A search system may receive a search query, e.g., a natural language search query, and then receive a follow-up query related to the first query. The follow-up query may contain anaphora, a word or words referring to or replacing a word used earlier in a sentence, to avoid repetition. When a query contains such anaphora, the search system can rewrite the follow-up query using knowledge gained from the first query so that a search engine can properly search for resources related to the follow-up query.

In one implementation, the methods comprise the steps: receiving a first query; receiving a second query; analyzing the second query for a presence of anaphora; if an anaphora is present, analyzing the first query for a presence of an entity associated with the anaphora if at least two associated entities are returned from analyzing the first query for a presence of an entity associated with the anaphor, forming a third query wherein the anaphora of the second query is replaced with one of the at least two associated entities and forming a fourth query wherein the anaphora is replaced with the other of the at least two associated entities; sending the third query and the fourth query to a query-ranking engine; receiving a ranking for the third query and a ranking for the fourth query; and sending a higher-ranked query to a search engine.

These and other implementations can each include one or more of the following features. The method can analyze results of the first query for a presence of an entity associated with the anaphora. The ranking step can be associated with a data repository containing past query logs. The past query logs can be mapped to metadata describing a popularity of queries, a frequency of use of queries, or a commonality of queries. The method can modify the third and fourth query wherein the modifying step includes one or more of dropping search terms, replacing search terms with synonyms and introducing new terms and ranking the third and fourth query using the modified queries. The method can rank the third and fourth query by ranking n-grams contained within the third and fourth queries.

In another implementation, a system can comprise one or more processors and one or more computer-readable storage mediums containing instructions configured to cause the one or more processors to perform operations. The operations can include: receiving a first query; receiving a second query; analyzing the second query for a presence of anaphora; if anaphora is present, analyzing the first query for a presence of an entity associated with the anaphora if at least two associated entities are returned from analyzing the first query for a presence of an entity associated with the anaphor, forming a third query wherein the anaphora of the second query is replaced with one of the at least two associated entities and forming a fourth query wherein the anaphora is replaced with the other of the at least two associated entities; sending the third query and the fourth query to a query-ranking engine; receiving a ranking for the third query and a ranking for the fourth query; and sending a higher-ranked query to a search engine.

In another implementation, a computer-program product can be tangibly embodied in a machine-readable storage medium and include instructions configured to cause a data processing apparatus to: receive a first query; receive a second query; analyze the second query for a presence of anaphora; if anaphora is present, analyze the first query for a presence of an entity associated with the anaphora if at least two associated entities are returned from analyzing the first query for a presence of an entity associated with the anaphor, form a third query wherein the anaphora of the second query is replaced with one of the at least two associated entities and form a fourth query wherein the anaphora is replaced with the other of the at least two associated entities; send the third query and the fourth query to a query-ranking engine; receive a ranking for the third query and a ranking for the fourth query; and send a higher-ranked query to a search engine.

One or more of the implementations of the subject matter described herein may provide one or more of the following advantages. The subject matter described herein presents a rewrite module that can transform and optimize a follow-up search query into a query that can be better understood by any data repository or search engine, as will be described more fully below. The disclosed technology also has the ability to allow a search engine to return better and more accurate results, as will be described more fully below.

BRIEF DESCRIPTION OF THE DRAWINGS

FIGS. 3a-b are flow charts showing an example process of replacing anaphora with two or more possible entities;

FIG. 4 are flow charts showing an example process of replacing anaphora with two or more possible entities; and FIG. 5 is a block diagram of an example of a system used with the disclosed technology.

DETAILED DESCRIPTION

The subject matter described herein relates to providing search results in response to search queries. In some implementations, a system may receive a search query, e.g., a natural language search query and then receive a follow-up query related to the first query. The follow-up query may contain anaphora, a word referring to or replacing a word used earlier in a sentence, to avoid repetition. When a query contains such anaphora, the system can rewrite the follow-up query using knowledge gained from the first query so that a search engine can understand and properly search for resources related to the follow-up query.

Figure 1:
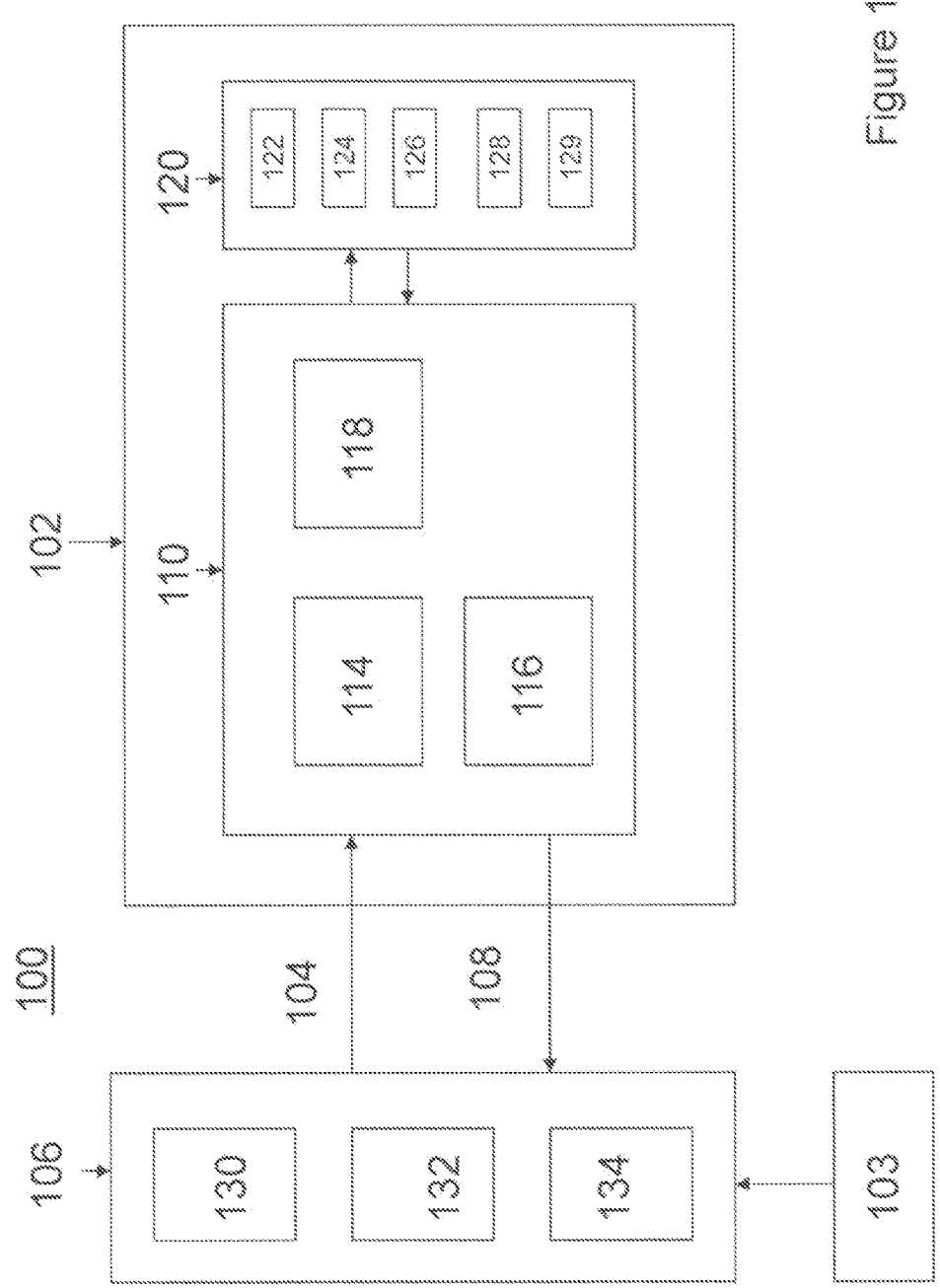
FIG. 1 is a block diagram of an example of a search system used with the disclosed technology.

FIG. 1 illustrates an example search system 100 for providing a search result or ranked search results relevant to submitted queries as can be implemented in an internet, an intranet, or another client and server environment. The search system 100 is an example of an information retrieval system in which the systems, components, and techniques described below can be implemented. The search system 100 can be used, for example, to generate a single search result germane to the query or to generate ordered sets of search results.

A user 103 can interact with server 102 of the search system 100 through a client device 106. For example, the client device 106 can be any mobile computing device, e.g., laptops, tablets, smartphones, etc., or the client device can be a computer coupled to the server side 102 through a local area network (LAN) or wide area network (WAN), e.g., the Internet. In some implementations, the server 102 and the client device 106 can be one machine. For example, a user 103 can install a desktop search application on the client device 106. The client device 106 will generally include a random access memory (RAM) 130 and a processor 132.

The server 102 can include a search engine 110. The server 102 responds to a query 104 by generating search results 108, which are transmitted through the network to the client device 106 in a form that can be presented to the user, e.g., a search results web page to be displayed in a web browser running on the client device 106. Or, a client device 106 can respond to user voice queries by presenting answers audibly by an audio output device associated with client device 106, e.g., a speaker, and/or displaying answers on a display, e.g., an active display screen. In some implementations, the answers may be presented either only audibly or only visually.

When the query 104 is received by the search engine 110, the search engine 110 identifies resources that match the query 104. The search engine 110 may also identify a particular section of each resource that is relevant to the query or of the highest ranked resource or resources that are relevant to the query. The server 102 will generally include: (1) an indexing engine 114 that indexes resources, e.g., web pages, images, or news articles on the Internet found in a corpus, e.g., a collection or repository of content, (2) an index database 118 that stores the index information, and (3) a ranking engine 116, or other software, to rank the resources that match the query 104. The indexing engine 114 can index information using traditional techniques.

In some implementations, if a search engine 110 receives a string of queries, e.g., a natural language query asking specific questions on a specific topic, subsequent queries to the initial query may include anaphora. In order for the search engine 110 to properly search the topic, the anaphora can be resolved before the query is sent to the search engine 110. In some implementations, a subsequent query can be received within a threshold amount of time from the initial query. The threshold amount of time can range from less than a second to a few hours or possibly more. If the subsequent query is received within the threshold amount of time, a modified query can be generated based on a search term of which the anaphora is associated with the initial query, as will be described more fully below.

To resolve these queries, the search engine 110 can be communicatively connected to a query rewrite engine 120. The rewrite engine 120 can be on the server side 102 or on a client side 106. The rewrite engine 120, among other things, can convert a query containing anaphora into a query containing a search term of which the anaphora was associated.

Figure 2:
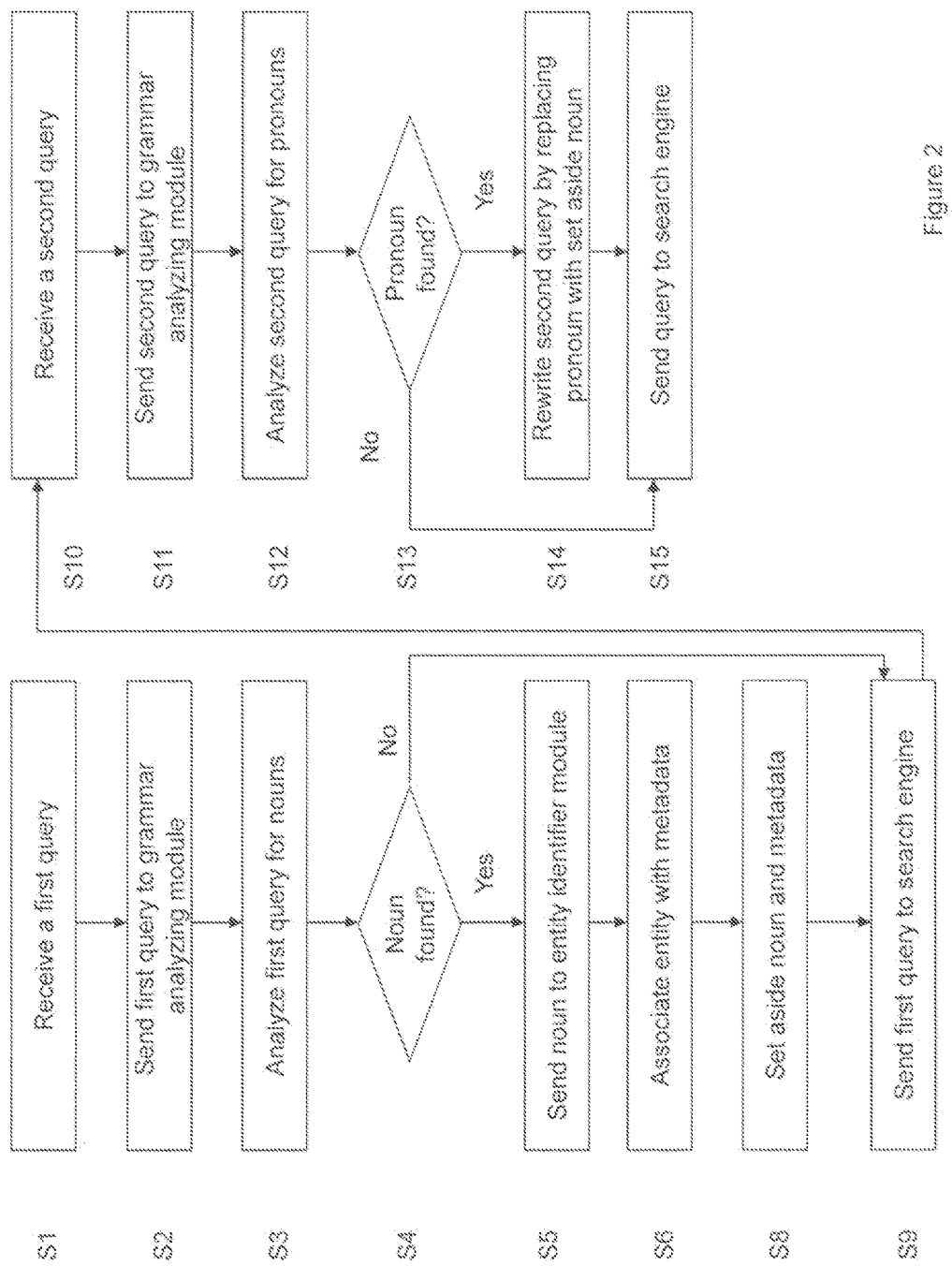
FIG. 2 is a flow chart showing an example process of replacing anaphora with entity information.

In some implementations, as shown in FIG. 1, the query rewrite engine 120 can include an entity identifier module 122 and a grammar analyzing module 124. As shown in the flow charts of FIG. 2, when the query rewrite engine 120 receives a first query (Step S1), the first query can be sent to a grammar analyzing module 124 (Step S2). The grammar analyzing module 124 can analyze the first query and identify grammar, e.g., nouns, within the query (Step S3). For example, the grammar analyzing module 124 can identify nouns, verbs, pronouns and all other parts of speech within a query. The different types of grammar can be learned using conventional machine learning algorithms that can use past queries and grammatical rules as training data.

If no noun is found within the query (Step S4), the query is sent to the search engine (Step 9). If a noun is determined to be in a query (Step S4), the noun can be sent to an entity identifier module (Step S5). The entity identifier module can be associated with a data repository containing all commonly searched entities and these entities can be mapped to metadata, e.g., is the entity a male, a female, a place, an object, or any other descriptive information (Step S6). In another implementation, the grammar module, or another module of the rewrite engine, can infer metadata from the textual representation of the entity, e.g., by having rules, such as, "names ending in 'a' are likely female." The rewrite engine can set aside the entity information (Step 7) and send the query to the search engine (Step S8). The search engine can process the query and return results associated with the query, as described above. If the results are provided in the form a single sentence answer to a question query, the entity identifier module can be used to identify an entity within the results, e.g., if the query is a question and an entity can be identified in an answer to the query question. Again, the query rewrite engine can receive results of a search and send the results to the grammar analyzing module to find if the results contain any known entities. If the results contain any known entities, the entity information associated with the results can be set aside for future use. In some implementation, result-based entities can be stored in a data repository so that the system does not have to do any sort of textual presentation of them, e.g., when the results to a query is a single local-business presented on a results page, the entity identifier module is not used because the answer was previously stored on the system and was stored with the answer's structure and any known entities contained within the answer. Additionally, in some implementations, parts of speech not recognized as nouns by the grammar module may also be set aside for future use. That is, the entity identifier module and the grammar module run separately and a positive indication from either of them that a part of speech is an entity is enough to save the entity for future use. Further, positive indications of a known entity from both the entity identifier module and the grammar module give extra weight to the known entity.

The rewrite engine receives a second query (Step S10). The second query can be sent to the grammar analyzing module (Step S11). The grammar analyzing module 124 can analyze the second query and identify grammar, e.g., anaphora, within the query (Step S12). If no anaphora is found within the query (Step S13), the query is sent to the search engine (Step 15). If anaphora is determined to be in a query (Step S13), the rewrite engine can rewrite the second query so that the anaphora can be replaced with the entity of the previous query (Step S14). That is, the rewrite engine can access the set aside entity information of the first query and replace the anaphora of the second query with the entity information of the first query. The modified second query can be sent to the search engine (Step S15).

In an example of an implementation of the disclosed technology, the first query can be "who is Ben Franklin." The entity of the first query was identified as "Ben Franklin." The first query can be sent to a search engine. The search engine can return a list of resources referencing Ben Franklin. A second query can be received within a certain time frame asking "what is his height." The pronoun "his" was recognized by the search engine to be part of the second query. The rewrite engine recognized that the pronoun "his" can be replaced with "Ben Franklin." A modified second query can be written that reads "what is Ben Franklin's height." This modified query can then be sent to a search engine and results can be received.

In another example of an implementation of the disclosed technology, the first query can be "where is the taj mahal." The entity of the first query can be "taj mahal." The second query can be "when was it built." The second query contained a pronoun "it." The modified second query can be rewritten to "when was taj mahal built."

FIGS. 3a-b and 4 illustrate examples of resolving pronoun ambiguity when several entities are identified for possible pronoun substitution. For example, a user may query [what is Kevin Bacon's father name] with a result of [Edmund Bacon] and then a user may ask a follow-up query of [what was the last movie he starred in]. The pronoun "he" may be replaced with either "Kevin Bacon" or "Edmund Bacon" as both choices are male.

In order to resolve the above pronoun ambiguity, the system can form two or more modified queries using identified entities, e.g., [what was the last movie Kevin Bacon starred in] and [what was the last movie Edmund Bacon starred in]. These modified queries can be sent to a query ranking module and ranked accordingly. The ranking can be associated with a data repository containing past query logs and these past query logs can be mapped to metadata describing, e.g., the popularity of the queries, the frequency of use for the queries, the commonality of the queries, etc. Once a rank for the queries is established, the higher ranked query can be sent to the search engine. In the above example, the query of [what was the last movie Kevin Bacon starred in] was a more popular search query than the query of [what was the last movie Edmund Bacon starred in]. Based on this determination, the query of [what was the last movie Kevin Bacon starred in] can be sent to the search engine.

In some implementations, an exact match of the query may not be required for a ranking to be performed. For example, if the query of [what was the last movie Kevin Bacon starred in] was not found in the data repository, the system can modify the query using the rewrite module. In other words, the rewrite engine can perform any number of format changes to the query for ranking purposes. For example, in some implementations, the rewrite engine can formulate similar queries by dropping search terms, replacing search terms with their synonyms, e.g., "pictures" to "photos," or introduce new terms into the query, e.g., "all." More specifically, the rewrite module can remove natural language annotations, stop words and other elements of speech from the query. When doing this, all language that is used to form a question may be removed from the query. This removal can increase the probability of getting a match in the repository. For example: [what was the last movie Kevin Bacon starred in] can be reformatted to [last movie Kevin Bacon starred]. The rewrite module can also replace speaking language with direct language. In other words, replace natural language lingo with domain lingo, e.g., [what was the last movie Kevin Bacon starred in] reformatted to [what was the last movie Kevin Bacon appeared]. In order to replace speaking language in such a manner, a repository containing common language conversions can be formed. These language conversions can be learned using conventional machine leaning algorithms that use past queries as training data and the language conversions can be stored in data repositories.

Now using the rewritten query, the query ranking algorithm can use these modified queries to make a determination of which modified query is higher ranked. For example, the query of the [last movie Kevin Bacon starred] can be determined to be ranked higher than [last movie Edmund Bacon starred] or the query of [what was the last movie Kevin Bacon appeared] can be higher ranked than [what was the last movie Edmund Bacon appeared]. If reformatted queries are used in the ranking of the queries, the higher ranked reformatted queries may be sent to the search engine, e.g., [what was the last movie Kevin Bacon appeared], or the reformatted query can be used for ranking purposes only and the originally modified query can be sent to the search engine instead, e.g., [what was the last movie Kevin Bacon starred in]. These query modifications allow the system to cover uncommon queries. Care can be exercised so that a rewritten query is not too dissimilar from the original query. This can be accomplished via some combination of absolute thresholds on the "distance" between queries and factoring the distance between queries into the scoring of possible interpretations.

As shown in the flow charts of FIGS. 3a-b, a search system can receive a first query (Step U1) and a second query (Step U2). The system analyzes the second query for a presence of anaphora (Step U3). If anaphora is not present (Step U4), the query is sent to a search engine (Step U4a). If anaphora is present (Step U4), the system analyzes the first query for a presence of an entity associated with the anaphora (Step U5). If the determination returns a single entity, a modified query can be generated by replacing the anaphora with the single entity (Step U6a). If the determination returns two or more associated entities (Step U6), the system forms a third query wherein the anaphora of the second query is replaced with one of the associated entities (Step U7) and forms a fourth query wherein the anaphora is replaced with the other of the associated entities (Step U8). The third query and the fourth query are sent to a query-ranking engine (Step U9). The third query and fourth query receive a ranking (Step U10). A higher-ranked query is sent to the search engine (Step 11).

It is worthy to note that in FIGS. 3a-b two queries are formed but any number of queries can be created dependent on the number of entities that were discovered. Additionally, in some implementations, the original query with its anaphora can be used as one of the queries to be ranked. That is, queries may contain entities, popular slogans, and song lyrics that include pronouns that do not need to be resolved. For example, a first query can be [who is barack obama] and a second query can be [he man movie]. The second query contains a pronoun, but the second query can remain unmodified because "he man" can be an entity of an action hero. In another example, a first query can be "what is taj mahal" and a second query can be "just do it." The second query contains a pronoun, but the second query can remain unmodified because "just do it" can be a popular slogan. In another example, a first query can be "who is michelle obama" and a second query can be "she practices her speech." The second query contains a pronoun, but the second query can remain unmodified because "she practices her speech" can be a musical lyric of a popular song.

In this situation, two queries may be formed, the first query can be an unmodified query and the second a modified query. Using the above example, the first query can be [he man movie] and the second query may be [barack obama man movie], or [just do it] and [just do taj mahal], or [she practices her speech] and [michelle obama practices her speech]. These query pairs can be sent to the query ranking module for a determination of which query is higher ranked.

In another implementation, an n-gram window around the anaphora to be resolved can be used. In other words, using a trained language model using query logs as the training data queries can be ranked based on the frequency of the n-gram and count as evidence all queries that contained the subsequence. For example, using two queries of [last movie Kevin Bacon starred] and [last movie Edmund Bacon starred], an n-gram can be used. The n-gram for the first query can be "movie Kevin Bacon star" and the n-gram for the second query may be "movie Edmund Bacon star." These n-grams can be sent to the query ranking module and ranked based on the frequency the n-gram appears in the query repository. The query associated with the higher ranked n-gram can be sent to the search engine.

As will be described in FIG. 4, in order to resolve the above pronoun ambiguity, the system can form a single query using a logical "OR" between identified entities. In an example illustration of an implementation of the disclosed technology, the query can be received using voice input. For example, a user asks aloud "Who invented the telephone?" The user device receives the voice query and responds to the voice query by answering "Alexander Graham Bell." Subsequently, user asks "Who was Alexander Graham Bell's father?" The user device receives the voice query and responds to the voice query by answering "Alexander Melville Bell." Subsequently, user asks "What is his birthday?" The user device receives the voice query and recognizes the query contains a pronoun that may need to be resolved. The system identifies the term "his" in voice query as a pronoun and rewrites the query to include both choices, e.g., [what is "Alexander Graham Bell's" OR "Alexander Melville Bell's" birthday?]. The rewritten query is sent to a search engine and the search engine uses conventional ranking algorithms to rank the results of this query. The search results obtained from the search engine are useful because many search engines are designed to rank highly those resources that contain the exact phrase sought. That is, web ranking tends to automatically surface answers with the correct interpretation. Therefore, Alexander Graham Bell's birth date would likely be the highest ranked search result because there is more content on the internet related to Alexander Graham Bell's birth date than Alexander Melville Bell's birth date.

As shown in the flow charts of FIG. 4, a search system can receive a first query (Step V1) and a second query (Step V2). The system analyzes the second query for a presence of anaphora (Step V3). If anaphora is not present (Step U4), the query is sent to a search engine (Step U4a). If anaphora is present (Step V4), the system analyzes the first query for a presence of an entity associated with the anaphora (Step V5). If the determination returns a single entity, a modified query can be generated by replacing the anaphora with the single entity (Step U6a) and the modified query can be sent to a search engine (Step V8). If the determination returns two or more associated entities (Step V6), the system forms a single modified query using a logical "OR" between the two or more associated entities (Step V7). The single modified query is sent to the search engine (Step V8).

In some cases, web ranking may return a mix of results of the two interpretations. This suggests that the user's query was legitimately ambiguous, so a mix of results is a reasonable response. In these cases, the user can be prompted by the system to identify the intended entity for the search. This can appear as a visual pop-up box on the display screen or can be asked aloud.

In certain circumstances, it may also be appropriate to include the original pronoun, or other anaphora, in the set of possible interpretations. For example, if a user searches [justin bieber tour dates] and then searches [how can I tell if he likes me]. The system may try to replace the "he" of the second query with "Justin Bieber." But the "he" in the second query may not actually refer to an entity and may be used generically to refer to a man. Therefore, a query may be created of [how can I tell if "he" OR "justin bieber" likes me]. The content on the web can determine that the naive interpretation of the query, as being about Justin Bieber, is incorrect since results score better for [how can I tell if he likes me] than [how can I tell if justin bieber likes me].

In another implementation, two queries may be written, e.g., [what is Alexander Graham Bell's birthday?] and [what is Alexander Melville Bell's birthday?]. Both of these queries can be sent to a search engine and the results of each query can be ranked against each other to determine which results are a better match for the user's query.

FIG. 5 is a schematic diagram of an example of a search system 10. The system 10 includes one or more processors 23, 33, one or more display devices 21, e.g., CRT, LCD, one or more interfaces 25, 32, input devices 22, e.g., keyboard, mouse, touch screen, etc., a rewrite engine 38, a search engine 36, and one or more computer-readable mediums 24, 34. These components exchange communications and data using one or more buses 41, 42, e.g., EISA, PCI, PCI Express, etc.

The term "computer-readable medium" refers to any non-transitory medium 24, 34 that participates in providing instructions to processors 23, 33 for execution. The computer-readable mediums 24, 34 further include operating systems 26, 31 with network communication code, rewriting code, searching code, result grouping code, query ranking code, result presentation code, and other program code.

The operating systems 26, 31 can be multi-user, multi-processing, multitasking, multithreading, real-time and the like. The operating systems 26, 31 may perform basic tasks, including but not limited to: recognizing input from input devices 22; sending output to display devices 21; keeping track of files and directories on computer-readable mediums 24, 34, e.g., memory or a storage device; controlling peripheral devices, e.g., disk drives, printers, etc.; and managing traffic on the one or more buses 41, 42.

The network communications code may include various components for establishing and maintaining network connections, e.g., software for implementing communication protocols, e.g., TCP/IP, HTTP, Ethernet, etc.

The rewriting code may provide various software components for performing the various functions of rewriting and reformatting submitted queries. The searching code may provide various software components for performing the various functions of searching data repositories and/or data indexes for information related to the search queries.

The result grouping code and query ranking code may provide various software components for performing the various functions for grouping search results, which can include clustering or otherwise assessing similarity among results. The results presentation code may also provide various software components for performing the various functions for presenting and modifying a user interface showing the search results.

Moreover, as will be appreciated, in some implementations, the system of FIG. 5 is split into a client-server environment communicatively connected over the internet 40 with connectors 41, 42, where one or more server computers 30 include hardware as shown in FIG. 5 and also the result grouping code, code for rewriting, code for ranking, code for searching and indexing data on a computer network, and code for generating results for submitted queries, and where one or more client computers 20 include hardware as shown in FIG. 5 and also the reformatting code and the results presentation code, which can be pre-installed or delivered in response to a query, e.g., an HTML page with the code included therein for interpreting and rendering by a browser program.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on mobile phones, smart phones, tablets, personal digital assistants, and computers having display devices, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, tactile feedback, etc.; and input from the user can be received in any form, including acoustic, speech, tactile input, etc. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page to a client device, e.g., for purposes of displaying data to and receiving user input from a user interacting with the client device. Data generated at the client device, e.g., a result of the user interaction can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. In some cases, the actions recited in the claims can be performed in a different order and still achieve desirable results. Moreover, the separation of various system components in the embodiments described above should not be understood as requiring such separation in all embodiments, and it should be understood that the described program components and systems can generally be integrated together in a single software product or packaged into multiple software products.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   receiving a first query;
   receiving a second, follow-up query;
   determining that a pronoun in the second, follow-up query is an anaphor by determining that the pronoun refers to an entity that is not present in the second, follow-up query;
   in response to determining that the pronoun in the second, follow-up query is an anaphor, determining that the first query is associated with a plurality of possible entities;
   generating a plurality of candidate queries, wherein each candidate query of the plurality of candidate queries is generated by replacing the pronoun in the second, follow-up query with a corresponding possible entity;
   ranking, using at least past query logs stored in a data repository, the plurality of candidate queries; and
   providing a highest-ranked candidate query of the plurality of candidate queries to a search engine and obtaining search results for the highest-ranked candidate query from the search engine.

2. The method of claim 1, wherein the past query logs associate past queries with at least one of a popularity of the past queries, a frequency of use of the past queries, or a commonality of the past queries, and wherein ranking the plurality of candidate queries comprises ranking the candidate queries based on at least one of a popularity of the candidate queries, a frequency of use of the candidate queries, or a commonality of the candidate queries.

3. The method of claim 1, further comprising:
   modifying one or more of the plurality of candidate queries before sending the plurality of candidate queries to the ranking engine.

4. The method of claim 3, wherein modifying one or more of the plurality of candidate queries comprises one or more of dropping search terms, replacing search terms with synonyms, or introducing new terms.

5. The method of claim 1, wherein determining that the first query is associated with a plurality of possible entities comprises:
   analyzing results of the first query for a presence of an entity associated with the anaphor.

6. The method of claim 1, further comprising:
   determining that the highest-ranked candidate query is ranked higher than the second, follow-up query; and
   providing the highest-ranked candidate query to the search engine in response to determining that the highest-ranked candidate query is ranked higher than the second, follow-up query.

7. The method of claim 1, further comprising:
   providing the search results for the highest-ranked candidate query for presentation to a user as part of a response to the second, follow-up query.

8. A system comprising one or more computers and one or more storage devices storing instructions that when executed by the one or more computers cause the one or more computers to perform operations comprising:
   receiving a first query;

receiving a second, follow-up query;
determining that a pronoun in the second, follow-up query is an anaphor by determining that the pronoun refers to an entity that is not present in the second, follow-up query;
in response to determining that the pronoun in the second, follow-up query is an anaphor, determining that the first query is associated with a plurality of possible entities;
generating a plurality of candidate queries, wherein each candidate query of the plurality of candidate queries is generated by replacing the pronoun in the second, follow-up query with a corresponding possible entity;
ranking, using at least past query logs stored in a data repository, the plurality of candidate queries; and
providing a highest-ranked candidate query of the plurality of candidate queries to a search engine and obtaining search results for the highest-ranked candidate query from the search engine.

9. The system of claim 8, wherein the past query logs associate past queries with at least one of a popularity of the past queries, a frequency of use of the past queries, or a commonality of the past queries, and wherein ranking the plurality of candidate queries comprises ranking the candidate queries based on at least one of a popularity of the candidate queries, a frequency of use of the candidate queries, or a commonality of the candidate queries.

10. The system of claim 8, the operations further comprising:
modifying one or more of the plurality of candidate queries before ranking the plurality of candidate queries.

11. The system of claim 10, wherein modifying one or more of the plurality of candidate queries comprises one or more of dropping search terms, replacing search terms with synonyms, or introducing new terms.

12. The system of claim 8, wherein determining that the first query is associated with a plurality of possible entities comprises:
analyzing results of the first query for a presence of an entity associated with the anaphor.

13. The system of claim 8, the operations further comprising:
determining that the highest-ranked candidate query is ranked higher than the second, follow-up query; and
providing the highest-ranked candidate query to the search engine in response to determining that the highest-ranked candidate query is ranked higher than the second, follow-up query.

14. The system of claim 8, the operations further comprising:
providing the search results for the highest-ranked candidate query for presentation to a user as part of a response to the second, follow-up query.

15. One or more non-transitory storage media encoded with a computer program, the computer program comprising instructions that when executed by one or more computers cause the one or more computers to perform operations comprising:
receiving a first query;
receiving a second, follow-up query;
determining that a pronoun in the second, follow-up query is an anaphor by determining that the pronoun refers to an entity that is not present in the second, follow-up query;
in response to determining that the pronoun in the second, follow-up query is an anaphor, determining that the first query is associated with a plurality of possible entities;
generating a plurality of candidate queries, wherein each candidate query of the plurality of candidate queries is generated by replacing the pronoun in the second, follow-up query with a corresponding possible entity;
ranking, using at least past query logs stored in a data repository, the plurality of candidate queries; and
providing a highest-ranked candidate query of the plurality of candidate queries to a search engine and obtaining search results for the highest-ranked candidate query from the search engine.

16. The non-transitory storage media of claim 15, wherein the past query logs associate past queries with at least one of a popularity of the past queries, a frequency of use of the past queries, or a commonality of the past queries, and wherein ranking the plurality of candidate queries comprises ranking the candidate queries based on at least one of a popularity of the candidate queries, a frequency of use of the candidate queries, or a commonality of the candidate queries.

17. The non-transitory storage media of claim 15, the operations further comprising:
modifying one or more of the plurality of candidate queries before ranking the plurality of candidate queries.

18. The non-transitory storage media of claim 15, wherein determining that the first query is associated with a plurality of possible entities comprises:
analyzing results of the first query for a presence of an entity associated with the anaphor.

19. The non-transitory storage media of claim 15, the operations further comprising:
determining that the highest-ranked candidate query is ranked higher than the second, follow-up query; and
providing the highest-ranked candidate query to the search engine in response to determining that the highest-ranked candidate query is ranked higher than the second, follow-up query.

20. The non-transitory storage media of claim 15, the operations further comprising:
providing the search results for the highest-ranked candidate query for presentation to a user as part of a response to the second, follow-up query.

* * * * *